W. CANTRELLE.
CULTIVATOR BLADE ATTACHMENT.
APPLICATION FILED JULY 18, 1911.
1,015,136.
Patented Jan. 16, 1912.
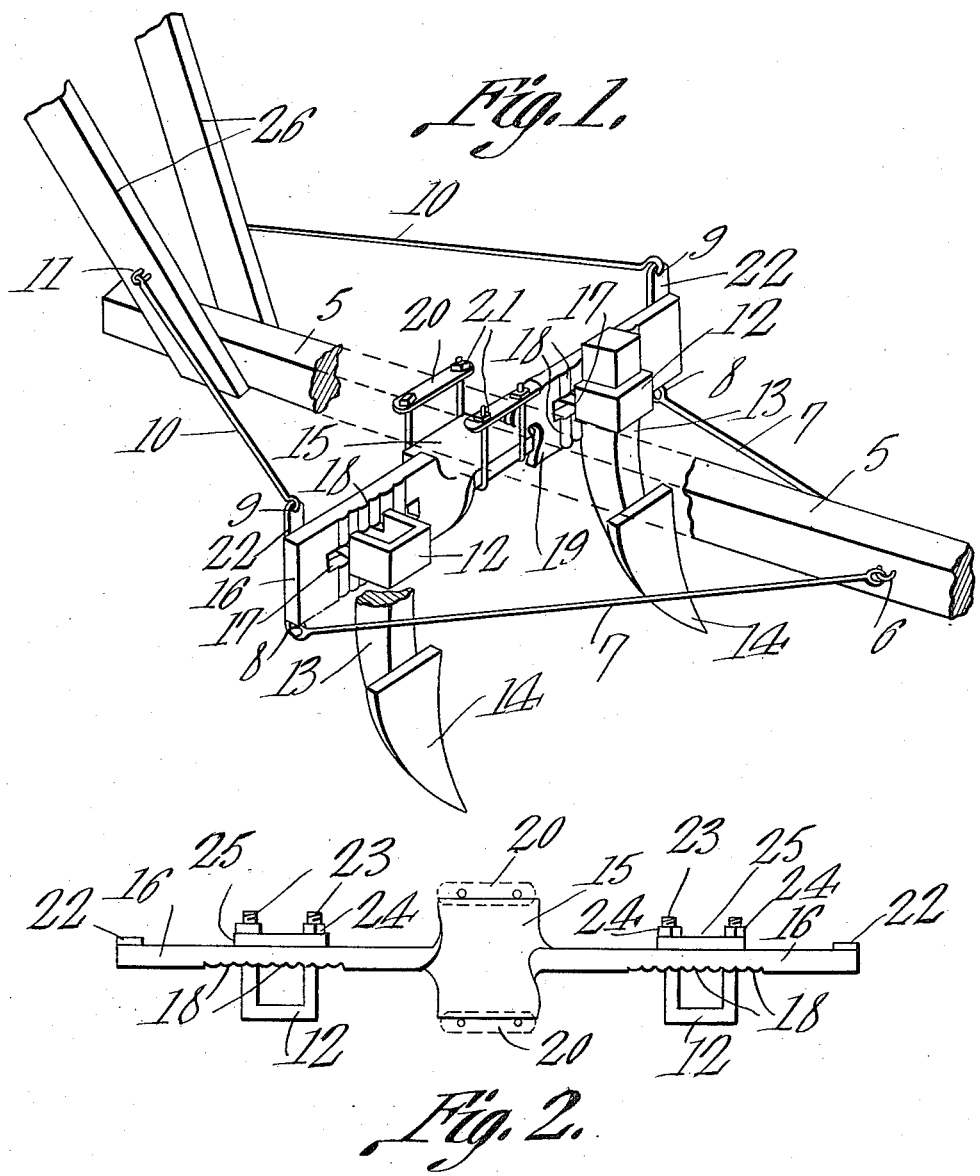
William Cantrelle,
Inventor
by C. A. Snow & Co.
Attorneys
Witnesses

UNITED STATES PATENT OFFICE.

WILLIAM CANTRELLE, OF LOCKPORT, LOUISIANA.

CULTIVATOR-BLADE ATTACHMENT.

1,015,136. Specification of Letters Patent. Patented Jan. 16, 1912.

Application filed July 18, 1911. Serial No. 639,156.

*To all whom it may concern:*

Be it known that I, WILLIAM CANTRELLE, a citizen of the United States, residing at Lockport, in the parish of Lafourche and State of Louisiana, have invented a new and useful Cultivator - Blade Attachment, of which the following is a specification.

This invention relates to agricultural implements and more particularly to cultivator blade attachments.

This invention has for its object to provide a simple, efficient and substantial cultivator attachment adapted to be secured to the beam of any common plow and cultivator and adapted to have blade standards or shanks secured thereto.

With the above and other objects in view this invention is embodied in the novel arrangement construction and combination of parts as hereinafter described and shown in the accompanying drawings, in which similar reference characters indicate similar parts, and in which, Figure 1 is a perspective of a plow frame with the attachment secured thereto, parts broken away. Fig. 2 is a plan view of the attachment.

Referring specifically to the drawings, 5 designates the beam of the plow frame and 26 the handles secured to the rear end thereof, as are common in plows and cultivator constructions.

The body of the attachment comprises a flat bar of metal forged to form a central horizontal portion 15 and lateral vertical wings 16. The central or intermediate portion 15 resting against the bottom of the beam has a pair of upstanding bolts 19 in spaced relation with each other, which are adapted to pass over the sides of the beam 5 and receive clips 20 on their upper ends which extend across the top of the beam to clamp the beam securely between the clips 20 and the portion 15 by means of the nut 21 provided on the upper ends of the bolts. This forms a convenient means for securing the attachment to the beam of a plow, or other structure. The wings 16 are provided with elongated horizontal slots 17 and are provided on their forward faces with a plurality of vertical flutes or corrugations 18 adjacent the edges of the slot 17. A U-shaped strap 12 is arranged in front of each wing 6 and has rearwardly projecting bolts 23 extending from the ends thereof through the slot 17 and on the rear end of the bolts 23 is mounted a washer 25 upon which the nuts 24 bear to draw the strap inward or rearward. Standards or shanks 13 carrying the blades or earth engaging members 14 on their lower ends are adapted to pass through the strap 12 and upon nuts 24 being tightened the same are securely clamped to the wings. When the nuts 24 are loosened the strap may be shifted laterally for adjusting the blades laterally as may be desired. The corrugations 18 serve to hold the standards or shanks 13 in position, the ends of the strap 12 engaging in the said corrugations. The U-shaped straps in receiving the standards and upon the nuts 24 being tightened cause the standards to be clamped against the wings of the attachment and the ends of said straps engage in the flutes 18 to prevent the horizontal movement of the standard. Thus upon loosening the said nuts the straps may be adjusted horizontally. The horizontal slot 17 extends through the vertical sides of the wings 16 and the flutes 18 are arranged in one side of the said wings, it being understood that the standards are clamped against the corresponding vertical sides of the wings with the said flutes.

At the outer end of each wing 16 is secured a vertical strip 22 having the upper eye 9 and the lower eye 8. Guides 7 are connected to the eyes 8 and are secured at their front ends to the front end of the beam 5 by means of a staple 6 or in any other manner, and rods 10 are connected to the respective eyes 9 and extend rearwardly, being secured to the handles 26 by means of a staple 11 or in any other suitable manner. The rods 7 connecting the lower edge of the wings with the forward end of the beam 5 and the rod 10 connecting the upper edge of the wings with the rear portion of the plow frame overcome the tendency of the wings to twist upon the blade 14 engaging the earth as the beam is drawn forward, and being secured to the ends of the wings also prevent them from swinging in a horizontal plane.

As is apparent from the above description this attachment can be readily applied to various types of plow frames or the like and the objects are attained in a convenient and efficient manner.

What is claimed is:—

An attachment of the character described comprising a body having vertical wings provided with elongated horizontal slots therein extending through the vertical sides of the wings and a plurality of vertical flutes in one side of the wings along the edges of the slots, U-shaped straps adapted to receive standards and having bolts projecting from the ends thereof through the respective slots, a washer on each pair of bolts, and nuts on the said bolts, whereby upon tightening the nuts the U-shaped straps clamp the standards against the vertical sides of the said wings and the ends of the straps engage in the said flutes to prevent horizontal movement of the standards.

In testimony that I claim the foregoing as my own, I have hereto affixed my signature in the presence of two witnesses.

WILLIAM CANTRELLE.

Witnesses:
 E. B. AYO,
 LIBERAL LEDET.

---

Copies of this patent may be obtained for five cents each, by addressing the "Commissioner of Patents, Washington, D. C."